(12) United States Patent
Kang et al.

(10) Patent No.: US 7,706,052 B2
(45) Date of Patent: Apr. 27, 2010

(54) DISPLAY DEVICE AND METHOD OF MANUFACTURING THE SAME

(75) Inventors: Won Seok Kang, Seoul (KR); Sung Jin Park, Daegu (KR); Ji Eun Chae, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 210 days.

(21) Appl. No.: 11/984,446

(22) Filed: Nov. 16, 2007

(65) Prior Publication Data
US 2008/0239459 A1 Oct. 2, 2008

(30) Foreign Application Priority Data
Mar. 30, 2007 (KR) ...................... 10-2007-0031651

(51) Int. Cl.
*G02B 7/02* (2006.01)
(52) U.S. Cl. .................... 359/296; 359/290; 345/107
(58) Field of Classification Search .............. 359/296, 359/290, 291, 238; 345/107, 84, 85
See application file for complete search history.

(56) References Cited

U.S. PATENT DOCUMENTS 6,741,305 B2 * 5/2004 Nakagawa et al. .......... 349/106
2006/0250348 A1 * 11/2006 Zhou et al. .................. 345/107

OTHER PUBLICATIONS

Henzen, et al., *13.2: Development of Active Matrix Electronic Ink Displays for Handheld Devices*, SID 03 Digest, pp. 176-179 (2003).

Zehner et al., *20.2: Drive Waveforms for Active Matirx Electrophoretic Displays*, SID 03 Digest, pp. 842-845 (2003).

Pitt, et al, *53.2: Power Consumption of Micro-Encapsulated Electrophoretic Displays for Smart Handheld Applications*, SID 02 Digest, pp. 1378-1381 (2002).

Duthaler et al., *53.1:Active-Matrix Color Displays Using Electrophoretic Ink and Color Filters*, SID 02 Digest, pp. 1374-1377 (2002).

R. M. Weber, *10.4: Image Stability in Active-Matrix Microencapsulated Electrophoretic Displays*, SID 02 Digest, pp. 126-129 (2002).

Amundson, et al., *12.3: Flexible, Active-Matrix Display Constructed Using a Microencapsulated Electrophoretic Material and an Organic-Semiconductor-Based Backplane*, SID 01 Digest, pp. 160-163 (2001).

Chen, et al., *12.2: A Comfortable Electronic Ink Display Using a Foil-Based a-Si TFT Array*, SID 01 Digest, pp. 157-159 (2001).

Kazlas et al., *12.1: 12.1 SVGA Microencapsulated Electrophoretic Active Matrix Display for Information Appliances*, SID 01 Digest, pp. 152-155 (2001).

* cited by examiner

*Primary Examiner*—Timothy J Thompson
(74) *Attorney, Agent, or Firm*—McKenna Long & Aldridge LLP

(57) ABSTRACT

Disclosed in an electrophoretic display device having a charged ink layer. In this disclosed device, the ink layer is disposed on the active region (an image display region) and the peripheral region located around the active region, and an electric field is applied to a portion of the electrophoretic ink film corresponding to the peripheral region. Therefore, the peripheral region does not look stained.

15 Claims, 6 Drawing Sheets

DISPLAY DEVICE AND METHOD OF MANUFACTURING THE SAME

This application claims the benefit of Korean Patent Application No. 0031651/2007, filed on Mar. 30, 2007, which is hereby incorporated by reference for all purposes as if fully set forth herein.

BACKGROUND OF THE INVENTION

1. Field of the Invention

The present invention relates to a display device and a method of manufacturing the display device.

2. Discussion of the Related Art

Display devices are used to convert electric data processed by a data processing device into images and display the images.

Examples of display devices include liquid crystal displays, organic electro-luminescence displays, plasma display panels, and electrophoretic displays.

The liquid crystal displays use liquid crystal for displaying images, and the organic electro-luminescence displays use organic electro-luminescence for displaying images. The plasma display panels use plasma for displaying images, and the electrophoretic displays use charged particles capable of reflecting or absorbing light for displaying images.

An electrophoretic display includes a substrate, pixel electrodes, an ink layer, and a common electrode. The pixel electrodes are arranged on the substrate in matrix format, and the ink layer is disposed on the pixel electrode. The ink layer includes charged nanoparticles. The charged nanoparticles include black nanoparticles or white nanoparticles. The common electrode is disposed on the ink layer.

An active region of the electrophoretic display is used to display images, and a peripheral region of the electrophoretic display is disposed around the active region. The ink layer covers the active region and the peripheral region. Since a voltage is not supplied to the peripheral region, the charged nanoparticles included in a region of the ink layer corresponding to the peripheral region are irregularly arranged, and thus the peripheral region can look stained.

SUMMARY OF THE INVENTION

Accordingly, the present invention is directed to a display device, method of manufacturing the same, and a method of operating the same that substantially obviate one or more of the problems due to limitations and disadvantages of the related art.

The details of one or more embodiments are set forth in the accompanying drawings and the description below. Other features will be apparent from the description and drawings, and from the claims.

An advantage of the present invention is to provide a display device in which the peripheral region does not look stained.

Another advantage of the present invention is to provide a method of manufacturing a display device in which the peripheral region does not look stained.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device includes a plurality of pixel driving elements in an active region of a substrate; a plurality of pixel electrodes in the active region, each pixel electrode being connected to one of the pixel driving elements; border driving elements in a peripheral region adjacent to the active region; at least one border electrode connected to at least one of the border driving elements; and an electrophoretic ink film over the active and peripheral regions, the electrophoretic ink film including an ink layer and a common electrode, the ink layer including microcapsules each having differently charged particles.

A method of manufacturing a display device according to the present invention, as embodied and broadly described, may include forming a common line on a first substrate in an active region and a peripheral region, wherein the common line includes first and second extension portions in the active region and the peripheral region, respectively; forming a gate line on the first substrate in the active region and the peripheral region, wherein the gate line includes a gate electrode corresponding to a pixel region in the active region; forming an insulation layer over the common line and the gate line; forming a channel pattern on the insulation layer; forming a data line and a drain electrode in the active region and forming a border electrode including a storage electrode in the peripheral region, wherein portions of the drain electrode overlap the first extension portions in the active region and wherein portions of the storage electrode overlap the second extension portions in the peripheral region; forming a passivation layer over the data line and border electrode, the passivation layer having contact holes therethrough; forming a pixel electrode over the passivation layer in the active region, wherein the pixel electrode contacts the drain electrode through at least one of the contact holes; forming a common electrode on a second substrate; and forming an electrophoretic ink layer over the pixel electrode, the ink layer including charged particles having at least two colors; and attaching the first and second substrates.

A method of operating a display device according to the present invention, as embodied and broadly described, may include providing a signal to the border electrode; and maintaining an orientation of a plurality of microcapsules in the electrophoretic ink film in the peripheral region according to the signal provided on the border electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall-within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Hereinafter, a display device and a method of manufacturing the display device will be more fully with reference to the accompanying drawings, in which exemplary embodiment of the present disclosure are shown. The present disclosure may, however, be embodied in many different forms and should not be construed as being limited to the embodiments set forth herein.

Figure 1:
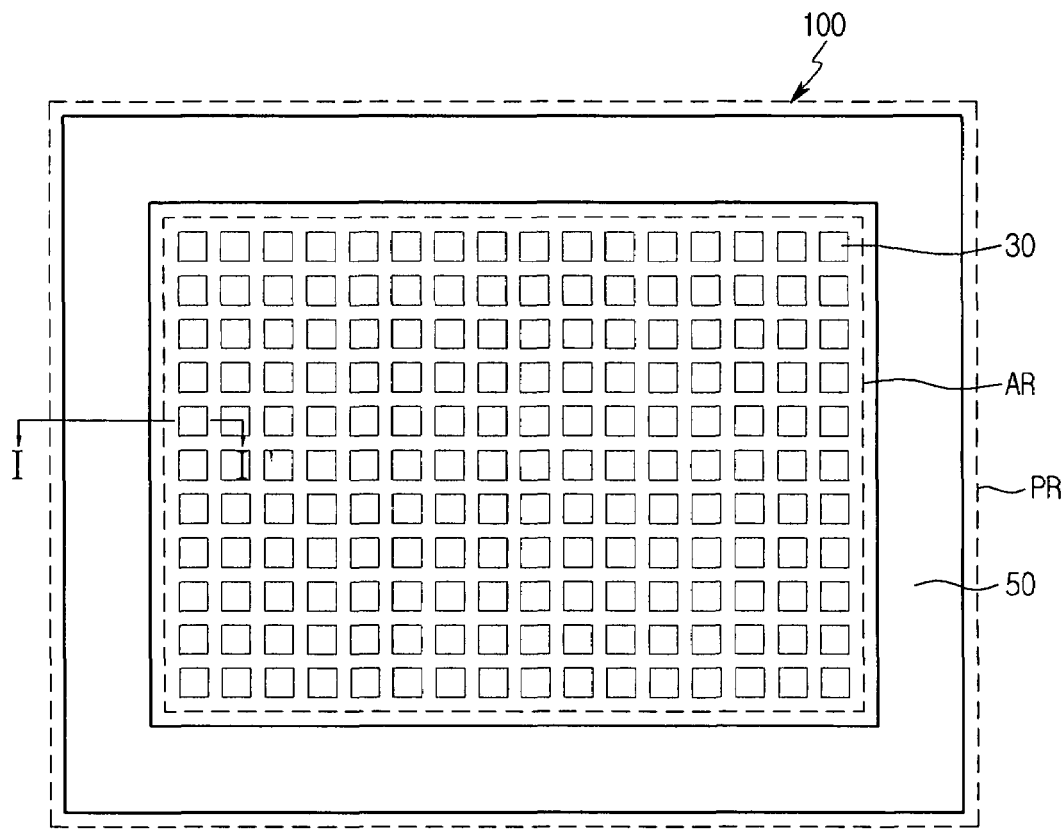
FIG. 1 is a plan view illustrating a display device according to an embodiment of the present invention.
Figure 2:
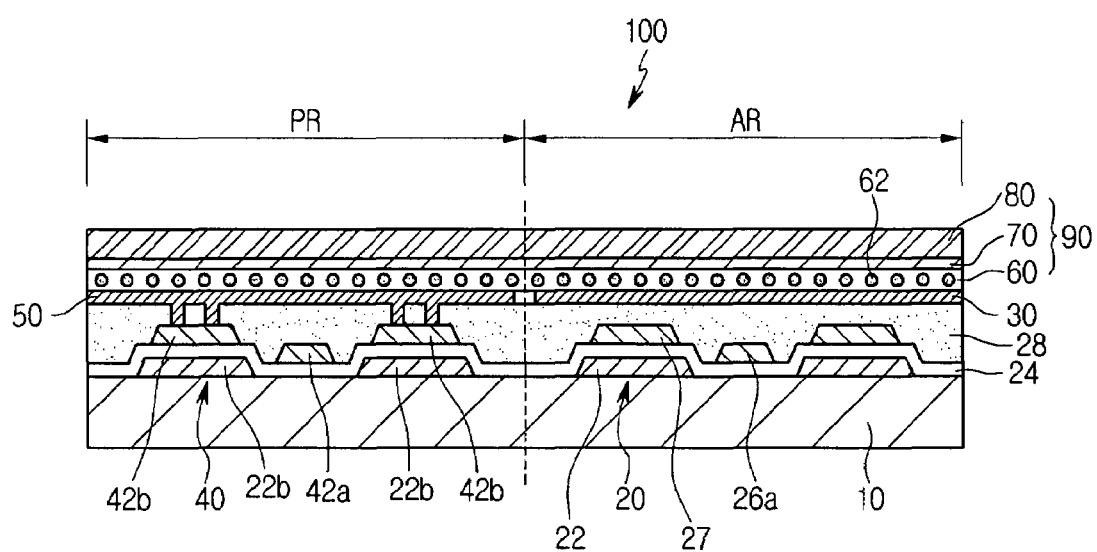
FIG. 2 is a section view taken along line I-I' of FIG. 1.

FIG. 1 is a plan view illustrating a display device 100 according to an embodiment; and FIG. 2 is a section view taken along line I-I' of FIG. 1.

Referring to FIGS. 1 and 2, the display device 100 includes a substrate 10, driving embodiments 20, pixel electrodes 30, border driving elements 40, a border pixel electrode 50, and an electrophoretic ink film 90.

The substrate 10 includes an insulation substrate. For example, the substrate 10 may include a transparent glass substrate or an opaque substrate. In the exemplary embodiment, the substrate 10 has a rectangular plate shape, but the substrate may have any shape, as would be appreciated by on of skill in the art.

In this example, the substrate 10 is divided into an active region AR and a peripheral region PR.

In this example, the active region AR located at a center portion of a top surface substrate 10. The active region AR has a rectangular shape when viewed from the front of the display device 100. The peripheral region PR is located around the active region AR. The peripheral region PR has a rectangular ring shape when viewed from the front of the display device 100.

Figure 3:
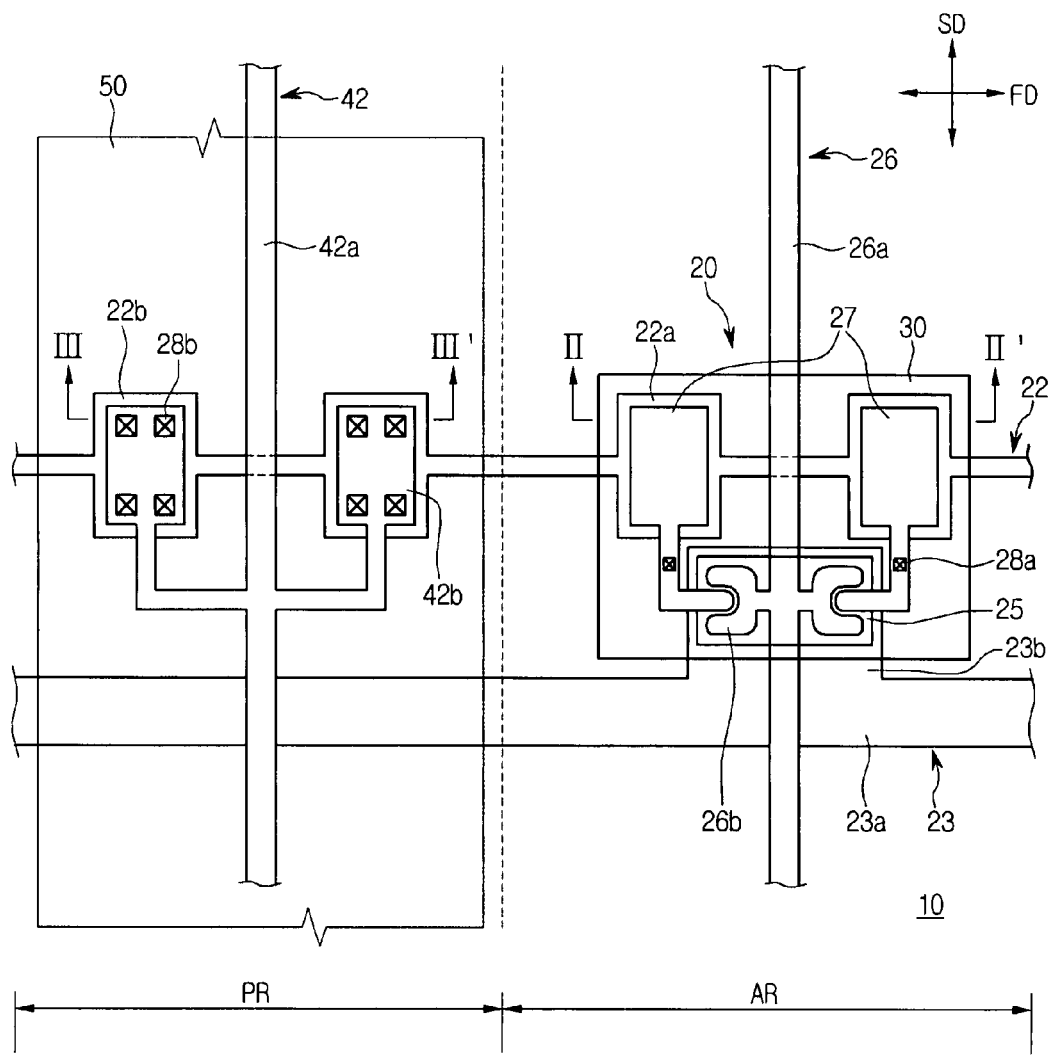
FIG. 3 is a plan view illustrating driving elements, a pixel electrode, border driving elements, and a border pixel electrode of the display device of FIG. 1.
Figure 4:
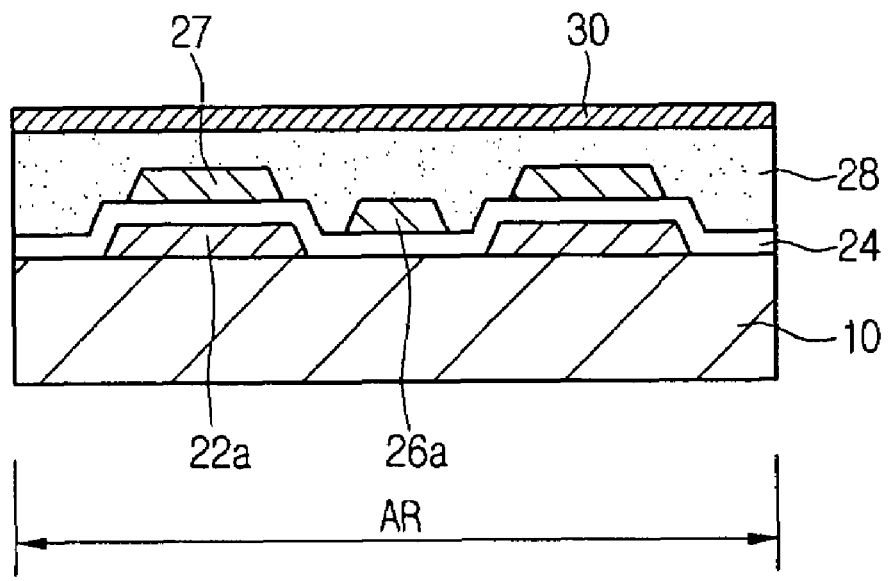
FIG. 4 is a sectional view taken along line II-II' of FIG. 3.

FIG. 3 is a plan view illustrating the pixel driving elements 20, the pixel electrode 30, the border driving elements 40, and the border pixel electrode 50 of the display device 100 depicted in FIG. 1, and FIG. 4 is a sectional view taken along line II-II' of FIG. 3.

Referring to FIGS. 3 and 4, the driving elements 20 are arranged in the active region AR. The driving elements 20 are electrically connected to the pixel electrode 30.

Each of the driving elements 20 include a common line 22, a gate line 23, an insulation layer 24, a channel pattern 25, a data line 26, drain electrodes 27, and a passivation layer 28.

The common line 22 is disposed on the substrate 10 in a first direction FD. In the current embodiment, examples of a material that can be used to forming the common line 22 include copper, chrome, an alloy including chrome, molybdenum, and an alloy thereof. In the current embodiment, the common line 22 extends from the active region AR to the peripheral region PR.

In the current embodiment, the common line 22 includes two extension portions 22a that are located in the active region AR and are spaced a predetermined distance from each other. The extension portions 22a increase the storage capacitance of the display device 100 and allow the display device 100 to be used as an electrophoretic display device.

The gate line 23 is disposed on the substrate 10 in the first direction FD. The gate line 23 is parallel to the common line 22. The gate line 23 is paired with the common line 22. Examples of a material that can be used for forming the gate line 23 include copper, chrome, an alloy including chrome, molybdenum, and an alloy thereof.

The gate line 23 includes a gate line part 23a and a gate electrode 23b. The gate line part 23a is parallel to the common line 22, and the gate electrode 23b extends from the gate line part 23a in a second direction SD perpendicular to the first direction FD. In the current embodiment, the gate electrode 23b is disposed substantially between the extension portions 22a of the common line 22.

The insulation layer 24 is disposed on the substrate 10 as shown in FIG. 4. The insulation layer 24 covers the common line 22 and the gate line 23, which may be disposed on the insulating substrate. Examples of a thin layer that can be used as the insulation layer 24 include a silicon oxide (SiOx) layer and a silicon nitride (SiNx) layer. In the current embodiment, the insulation layer 24 extends from the active region AR to the peripheral region PR of the substrate 10.

The channel pattern 25 is disposed on the insulation layer 24 and overlaps the gate electrode 23b of the gate line 23. The channel pattern 25 may include an amorphous silicon pattern (not shown) and an n+ amorphous silicon pattern (not shown) heavily doped with a conductive dopant such as indium (P). In this case, the amorphous silicon pattern of the channel pattern 25 may be disposed on a portion of the insulation layer 24 corresponding to the gate electrode 23b, and the n+ amorphous silicon pattern of the channel pattern 25 may be disposed on the amorphous silicon pattern.

The data line 26 is disposed on the insulation layer 24. The data line 26 includes a data line part 26a and source electrodes 26b.

The data line part 26a is disposed in the second direction SD. In detail, the data line part 26a is disposed between the extension portions 22a of the common line 22. The source electrodes 26b extend from the data line part 26a. The source electrodes 26b are disposed on the channel pattern 25. The source electrodes 26b may extend from both sides of the data line part 26a, respectively. The source electrodes 26b may have a horseshoe shape when viewed from the front of the display device 100.

The drain electrodes 27 are formed on the insulation layer 24. Portions of the drain electrodes 27 are surrounded by the source electrodes 26b having a horseshoe shape, and the other portions of the drain electrodes 27 overlap the extension portions 22a of the common line 22. The portions of the drain electrodes 27 that overlap the extension portions 22a of the common line 22 may have substantially the same size as the extension portions 22a for increasing the storage capacitance of the display device 100.

The passivation layer 28 is disposed above the substrate 10. The passivation layer 28 can include an organic material. The passivation layer 28 covers the data line 26 and the drain electrodes 27. Alternatively, the passivation layer 28 can include an inorganic material such as an oxide or a nitride. The passivation layer 28 may thus have a flat surface.

The passivation layer 28 includes contact holes 28a to expose portions of the drain electrodes 27. The contact holes 28a exposing portions of the drain electrodes 27 may be disposed outside the extension portions 22a of the common line 22.

The pixel electrode 30 is disposed on the passivation layer 28. Examples of a material that can be used for forming the pixel electrode 30 include transparent conductive materials such as indium tin oxide (ITO), indium zinc oxide (IZO), and amorphous indium tin oxide (a-ITO).

The pixel electrode 30 is electrically connected to the portions of the drain electrodes 27 exposed by the contact holes 28a.

Figure 5:
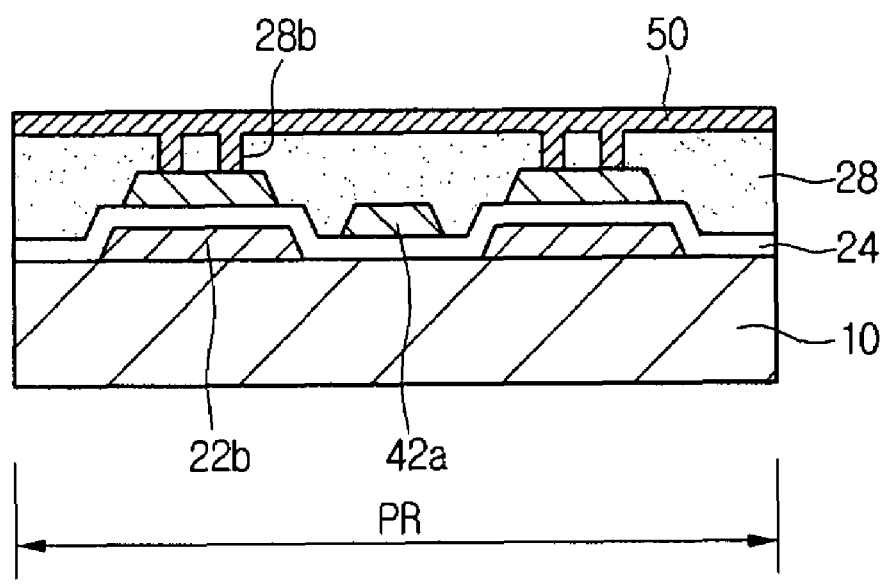
FIG. 5 is a sectional view taken along line III-III' of FIG. 3.

FIG. 5 is a sectional view taken along line III-III' of FIG. 3.

Referring to FIGS. 3 and 5, the border driving elements 40 and the border pixel electrode 50 are disposed in the peripheral region PR of the substrate 10.

In the peripheral region PR of the substrate 10, the border driving elements 40 are electrically connected to the border pixel electrode 50 (one in number).

Each of the border driving elements 40 includes the common line 22, the insulation layer 24, a border electrode 42, and the passivation layer 28.

In the peripheral region PR, the common line 22 is disposed on the substrate 10 in the first direction FD. In the current embodiment, examples of a material that can be used to form the common line 22 include copper, chrome, an alloy including chrome, molybdenum, and an alloy thereof.

In the current embodiment, the common line 22 includes two extension portions 22b that are disposed in the peripheral region PR and spaced apart from each other.

The insulation layer 24 is disposed in the peripheral region PR of the substrate 10 as shown in FIG. 5. The insulation layer 24 covers the common line 22 in the peripheral region PR. Examples of a thin layer that can be used as the insulation layer 24 include a silicon oxide (SiOx) layer and a silicon nitride (SiNx) layer.

The border electrode 42 is disposed on the insulation layer 24. The border electrode 42 includes a border electrode part 42a and storage electrodes 42b.

The border electrode part 42a is disposed in the second direction SD. In detail, the border electrode part 42a is disposed between the extension portions 22b of the common line 22. The storage electrodes 42b extend from the border electrode part 42a. The storage electrodes 42b overlap the extension portions 22b of the common line 22, respectively. Portions of the storage electrodes 42b overlapping the extension portions 22b may have substantially the same size as the extension portions 22b for increasing the storage capacitance of the display device 100.

The passivation layer 28 is disposed above the substrate 10. The passivation layer 28 can include an organic material. The passivation layer 28 covers the border electrode 42. Alternatively, the passivation layer 28 can include an inorganic material such as an oxide or a nitride. The passivation layer 28 thus may have a flat surface.

The passivation layer 28 includes contact holes 28b to expose portions of the storage electrodes 42b. The contact holes 28b may be disposed at portions of the storage electrodes 42b overlapping the extension portions 22b of the common line 22. In the current embodiment, at least two contact holes 28b are disposed at each of the storage electrodes 42b. For example, in FIG. 3, four contact holes 28b are shown for each storage electrode 42b overlapping the extension portion 22b.

The border pixel electrode 50 is disposed on the passivation layer 28. The border pixel electrode 50 is selectively disposed in the peripheral region PR. There may be one border pixel electrode 50 for the display. Examples of a material that can be used for forming the border pixel electrode 50 include transparent, conductive materials such as ITO, IZO, and a-ITO.

The border pixel electrode 50 is electrically connected to the portions of the storage electrodes 42b exposed by the contact holes 28a.

Referring again to FIG. 2, the electrophoretic ink film 90 is formed above the substrate 10 including the driving elements 20, the pixel electrode 30 connected to the driving elements 20, the border driving elements 40, and the border pixel electrode 50 connected to the border driving elements 40. The electrophoretic ink film 90 is used for displaying images.

The electrophoretic ink film 90 includes an ink layer 60, a common electrode 70, and a support member 80. The ink layer 60 includes a plurality of microcapsules 62. The microcapsules 62 include at least two kinds of charged particles for displaying an image. For example, the microcapsules 62 include black charged particles and white charged particles for displaying a black and white image. Alternatively, the microcapsules 62 can include colored charge particles such as red, green, blue, and black charged particles for displaying a full color image.

The common electrode 70 of the ink layer 60 is disposed on the ink layer 60. Examples of a material that can be used for forming the common electrode 70 include transparent, conductive materials such as ITO, IZO, and a-ITO.

The support member 80 is disposed on the common electrode 70. The support member 80 supports the ink layer 60 and the common electrode 70. The support member 80 can be formed of a transparent synthetic resin substrate, or the like.

Figure 6:
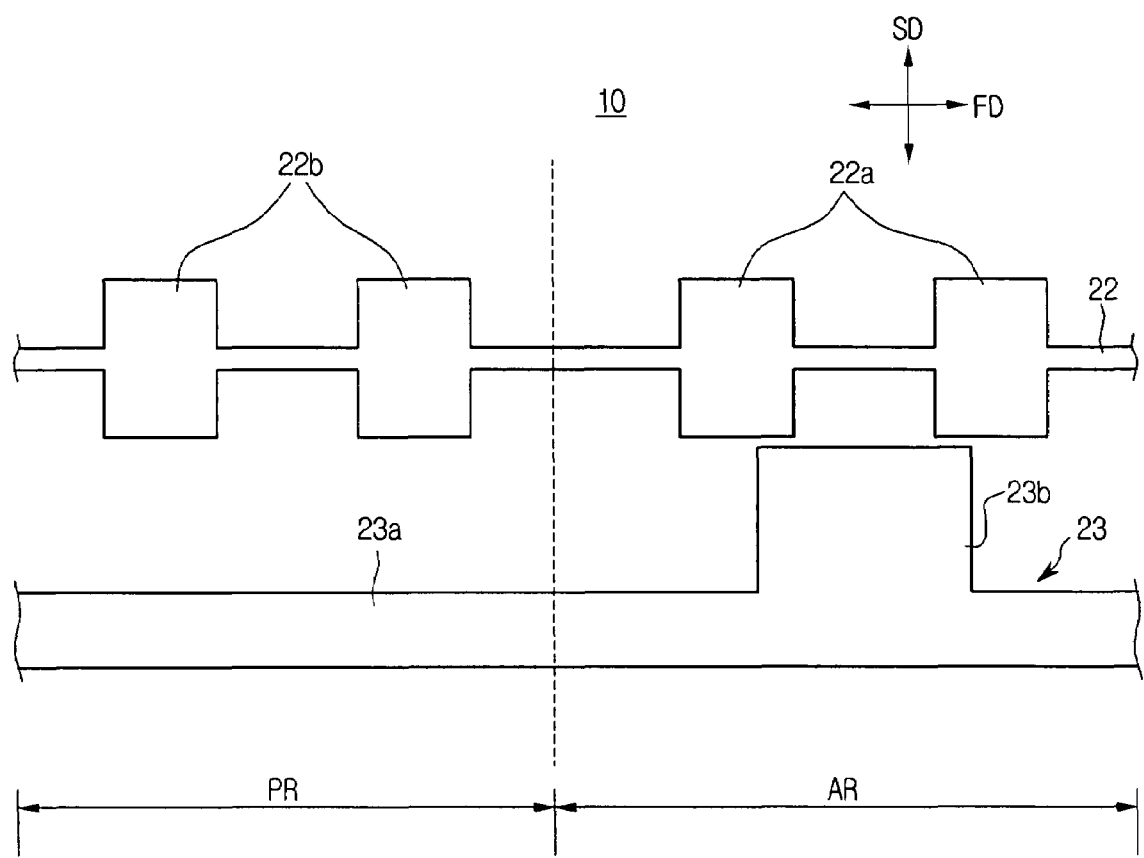
FIGS. 6 to 8 are plan views for explaining a method of manufacturing a display device according to an embodiment of the present invention.
Figure 7:
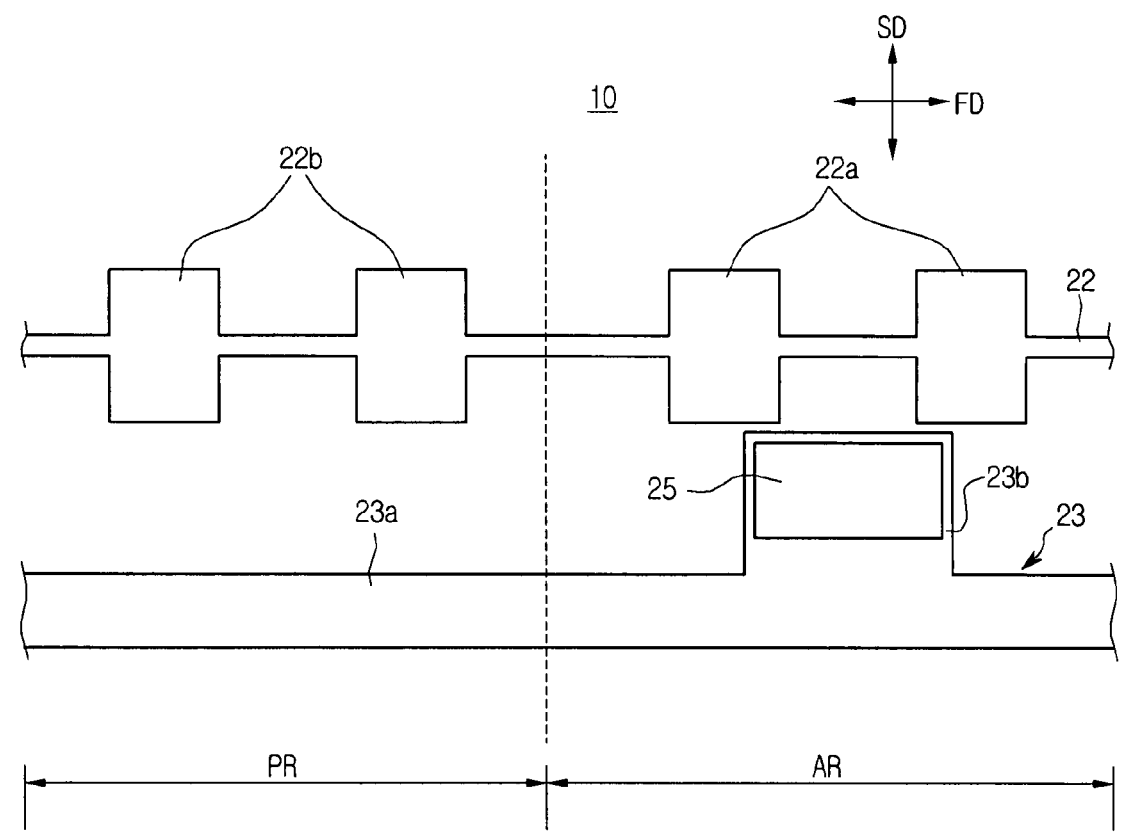
Figure 8:
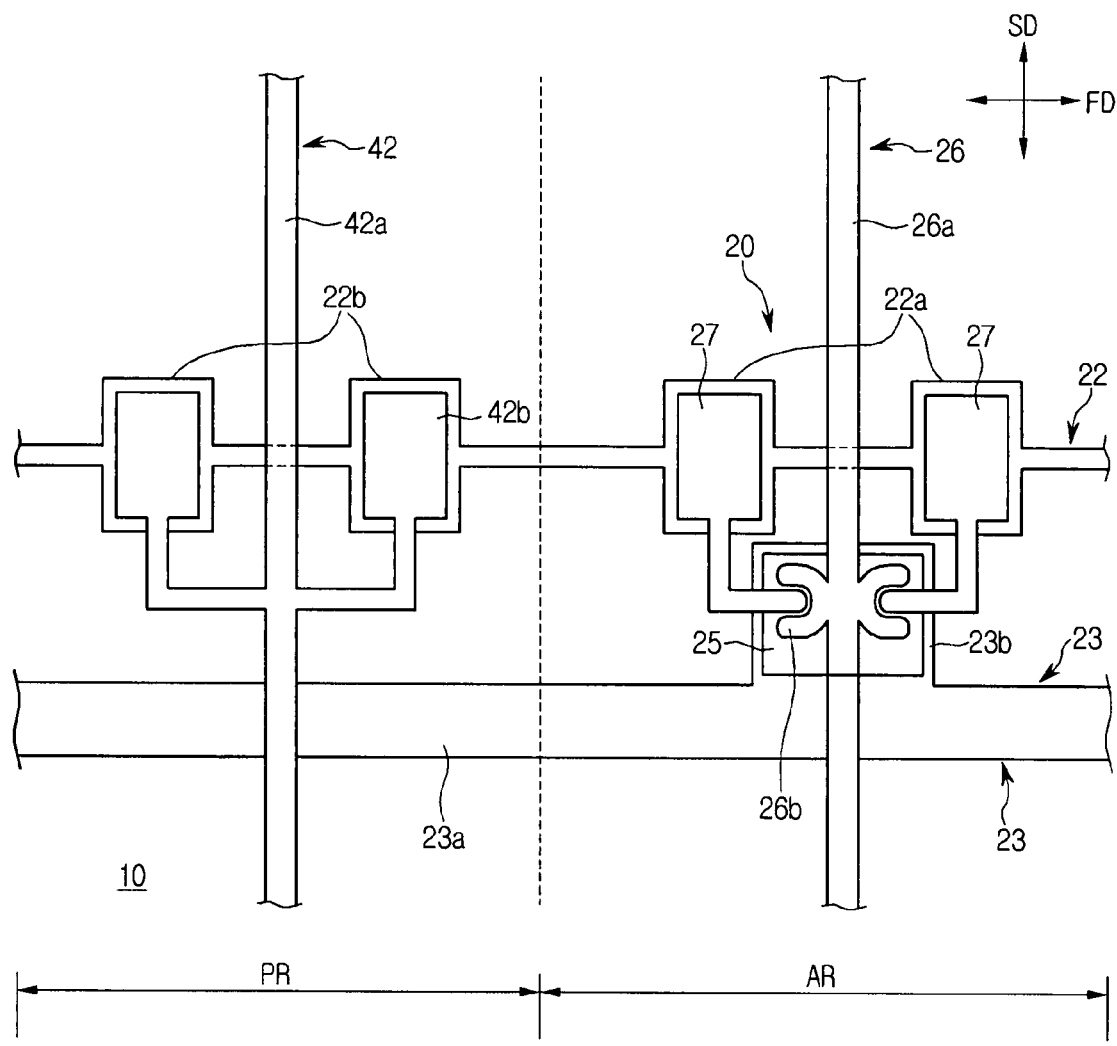

FIGS. 6 to 8 are plan views for explaining a method of manufacturing a display device according to an embodiment.

Referring to FIG. 6, a metal layer (not shown) is disposed on a substrate 10 having an active region AR and a peripheral region PR around the active region. The metal layer may be formed by physical chemical vapor deposition (PCVD) such as sputtering. Examples of a material that can be used for forming the metal layer include copper, chrome, an alloy including chrome, molybdenum, and an alloy thereof.

In this example, a photoresist film is formed on the metal layer. The photoresist film may be formed by spin coating or slit coating. The photoresist film is patterned through a photolithography process including exposing and developing. Thus, a photoresist pattern can be formed on the metal layer.

Thereafter, the metal layer is etched using the photoresist pattern as an etch mask to simultaneously form a common line 22 and a gate line 23 in the active and peripheral regions AR and PR of the substrate 10.

The common line 22 is formed in the active and peripheral regions AR and PR in a first direction FD.

In the current embodiment, the common line 22 includes first extension portions 22a in the active region AR and second extension portions 22b in the peripheral region PR. The first and second extension portions 22a and 22b largely increase the storage capacitance of the display device and allow the display device to be used as an electrophoretic display device.

The gate line 23 extends along the active and peripheral regions AR and PR of the substrate 10 in the first direction FD. The gate line 23 and the common line 22 are substantially parallel to each other. Though not shown in this example, gate lines 23 and common lines 22 are disposed on the substrate 10 in an alternating manner.

The gate line 23 includes a gate line part 23a and a gate electrode 23b. The gate line part 23a is substantially parallel to the common line 22, and the gate electrode 23b extends from the gate line part 23a in a second direction SD substantially perpendicular to the first direction FD. In the current embodiment, the gate electrode 23b is selectively disposed in the active region AR of the substrate 10, and no gate electrode 23b is disposed in the peripheral region PR of the substrate 10. The gate electrode 23b is aligned between the first extension portions 22a of the common line 22.

After the common line 22 and the gate line 23 are formed, an insulation layer (not shown) is formed to cover the common line 22 and the gate line 23. In the current embodiment, the insulation layer can be formed by chemical vapor deposition (CVD) using a silicon oxide or a silicon nitride.

Referring to FIG. 7, after the insulation layer is formed, a channel layer (not shown) is formed on the entire surface of the insulation layer. The channel layer may be an amorphous silicon layer and/or an n+ amorphous silicon layer heavily doped with a conductive dopant such as indium (P).

A photoresist pattern (not shown) is disposed on the channel layer by photolithography, and the channel layer is etched using the photoresist pattern as an etch mask to form a channel pattern 25 on the insulation layer. In the current embodiment, the channel pattern 25 is formed on a portion of the insulation layer corresponding to the gate electrode 23b formed in the active region AR of the substrate 10.

Referring to FIG. 8, after the channel pattern 25 is formed, a metal layer (not shown) is formed on the insulation layer. Examples of a material that can be used for forming the metal layer include aluminum and an alloy including aluminum. The metal layer can be formed by sputtering.

After the metal layer is formed on the insulation layer, a photoresist pattern (not shown) is formed on the metal layer by photolithography. Then, the metal layer is etched using the photoresist pattern as an etch mask, such that a data line 26 and drain electrodes 27 can be formed in the active region AR of the substrate 10, and a border electrode 42 can be formed in the peripheral region PR of the substrate 10.

The data line 26 formed in the active region AR includes a data line part 26a and source electrodes 26b. The data line part 26a is formed in the second direction SD perpendicular to the first direction FD. In detail, the data line part 26a is disposed between the first extension portions 22a of the common line 22. The source electrodes 26b extend on the insulation layer from the data line part 26a. The source electrodes 26b are disposed on the channel pattern 25. The source electrodes 26b extend from both sides of the data line part 26a, respectively. The source electrodes 26b may have a horseshoe shape when viewed from the front of the display device.

The drain electrodes 27 are formed on the insulation layer. Portions of the drain electrodes 27 are surrounded by the source electrodes 26b having a horseshoe shape, and the other portions of the drain electrodes 27 overlap the first extension portions 22a of the common line 22. The portions of the drain electrodes 27 that overlap the first extension portions 22a of the common line 22 may have substantially the same size as the first extension portions 22a for increasing the storage capacitance of the display device.

The border electrode 42 is disposed on the insulation layer in the peripheral region PR. The border electrode 42 includes a border electrode part 42a and storage electrodes 42b.

The border electrode part 42a is disposed in the second direction SD substantially perpendicular to the first direction FD. In detail, the border electrode part 42a is disposed between the second extension portions 22b of the common line 22. The storage electrodes 42b extend from the border electrode part 42a on the insulation layer 24. The storage electrodes 42b overlap the second extension portions 22b of the common line 22, respectively. Portions of the storage electrodes 42b overlapping the second extension portions 22b may have substantially the same size as the second extension portions 22b for increasing the storage capacitance of the display device.

Referring again to FIG. 3, after the data line 26 and the drain electrodes 27 are formed in the active region AR and the border electrode 42 is formed in the peripheral region PR, a passivation layer (not shown) is disposed above the substrate 10 to cover the data line 26, the drain electrodes 27, and the border electrode 42. In the current embodiment, the passivation layer includes an organic substance. In this case, the passivation layer can be formed by spin coating or slit coating. Alternatively, the passivation layer can include an inorganic substance. In this case, the passivation layer can be formed by sputtering or CVD.

After the passivation layer is formed, a photoresist pattern is formed on the passivation layer by photolithography, and the passivation layer is patterned using the photoresist pattern as an etch mask to form contact holes 28a and 28b in the active and peripheral regions AR and PR.

In detail, the contact holes 28a are formed in the active region AR to partially expose the drain electrodes 27. The contact holes 28a may expose portions of the drain electrodes 27 located outside the first extension portions 22a of the common line 22.

Meanwhile, the contact holes 28b are formed in the peripheral region PR to partially expose the storage electrodes 42b.

After the contact holes 28a and 28b are formed in the passivation layer, a transparent conductive layer (not shown) is formed on the passivation layer. In the current embodiment, the transparent conductive layer can be formed by CVD or sputtering. Examples of a material that can be used for forming the transparent conductive layer include transparent, conductive materials such as ITO, IZO, and a-ITO.

A photoresist pattern is formed on the transparent conductive layer by photolithography, and the transparent conductive layer is patterned using the photoresist pattern as an etch mask to form a pixel electrode 30 and a border pixel electrode 50 on the passivation layer.

The pixel electrode 30 is formed in the active region AR and is electrically connected to the drain electrodes 27 through the contact holes 28a.

The border pixel electrode 50 is formed in the peripheral region PR and is electrically connected to the storage electrodes 42b through the contact holes 28b.

As shown in FIG. 2, an electrophoretic ink film 90 is formed above the substrate 10. The electrophoretic ink film 90 includes an ink layer 60, a common electrode 70, and a support substrate 80. To prepare the electrophoretic ink film 90, the common electrode 70 is formed on the entire surface of the support substrate 80 that is transparent. The common electrode 70 can be formed by sputtering or CVD. The common electrode 70 may include a transparent and conductive material such as ITO, IZO, or a-ITO.

The ink layer 60 is formed on the common electrode 70. The ink layer 60 includes microcapsules having charged particles. The ink layer 60 can be formed by applying an ink material to the common electrode 70 to form a preliminary ink layer and drying the preliminary ink layer. Here, in this example, the ink material includes microcapsules and is soluble in a solvent.

Thereafter, the electrophoretic ink film 90 including the support substrate 80, the common electrode 70, and the ink layer 60 is attached to the substrate 10 with the ink layer 60 facing the pixel electrode 30 and the border pixel electrode 50. In this way, the display device is formed. As can be seen in FIG. 1, the active region AR includes a plurality of pixel regions. Referring to FIGS. 3 and 4, the pixel region is controlled according to a switching element, for example a thin film transistor formed by the gate electrode 23b, a channel part 25 and a source electrode 26b. A data signal is supplied to the data line 26 and is applied to the pixel electrode when the switching element is turned on, that is, when a gate signal is applied to the gate line 23.

Referring again to FIG. 3, when there is a charge on the storage electrode 42b (supplied by the border electrode 42), a charge is supplied to the border pixel electrode to control the microcapsules in the peripheral region PR according to a potential difference between the common line 22 and the border electrode 42. Since there is no switching element in the peripheral region PR, the potential difference can be held constant according to a signal on the border electrode 42 and the common line 22. Thus, the microcapsules 62 in the ink layer in the peripheral region maintain a substantially constant orientation to maintain an "image" or border, that is, to not appear stained.

As described above, according to the display device of the present disclosure, the electrophoretic ink film is disposed on the active region (an image display region) and the peripheral region located around the active region, and an electric field is applied to a portion of the electrophoretic ink film corresponding to the peripheral region. Therefore, the peripheral region does not look stained.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
    a plurality of pixel driving elements in an active region of a substrate;
    a plurality of pixel electrodes in the active region, each pixel electrode being connected to one of the pixel driving elements;
    border driving elements in a peripheral region adjacent to the active region;
    at least one border electrode connected to at least one of the border driving elements; and
    an electrophoretic ink film over the active and peripheral regions, the electrophoretic ink film including an ink layer and a common electrode, the ink layer including microcapsules each having differently charged particles,
    wherein the border driving elements in the peripheral regions include a border storage capacitor,
    wherein the border electrode includes at least one border electrode extension portion in the peripheral region, the border electrode extension portion acting as a storage electrode of the border storage capacitor.

2. The display device of claim 1, wherein the pixel driving elements include a storage capacitor and a switching element.

3. The display device of claim 2, further comprising a common line in the active region, wherein the common line includes at least one extension portion in the active region, the extension portion acting as a storage electrode of the storage capacitor.

4. The display device of claim 1, further comprising a common line in the peripheral region, wherein the common line includes at least one border common line extension portion in the peripheral region, the border common line extension portion acting as a second storage electrode of the border storage capacitor.

5. The display device of claim 4, further comprising a border pixel electrode in the peripheral region electrically coupled with the border common line extension portion.

6. The display of claim 4, wherein the border common line extension portion and the border electrode extension portion have substantially the same area.

7. The display device of claim 4, comprising a plurality of border pixel electrodes in the peripheral region electrically coupled with the border common line extension portion.

8. The display of claim 1, wherein the ink layer includes charged particles having at least two colors.

9. A method of manufacturing a display device, comprising:
    forming a common line on a first substrate in an active region and a peripheral region, wherein the common line includes first and second extension portions in the active region and the peripheral region, respectively;
    forming a gate line on the first substrate in the active region and the peripheral region, wherein the gate line includes a gate electrode corresponding to a pixel region in the active region;
    forming an insulation layer over the common line and the gate line;
    forming a channel pattern on the insulation layer;
    forming a data line and a drain electrode in the active region and forming a border electrode including a storage electrode in the peripheral region, wherein portions of the drain electrode overlap the first extension portions in the active region and wherein portions of the storage electrode overlap the second extension portions in the peripheral region;
    forming a passivation layer over the data line and border electrode, the passivation layer having contact holes therethrough;
    forming a pixel electrode over the passivation layer in the active region, wherein the pixel electrode contacts the drain electrode through at least one of the contact holes;

forming a common electrode on a second substrate; and forming an electrophoretic ink layer over the pixel electrode, the ink layer including charged particles having at least two colors; and attaching the first and second substrates.

10. The method of claim 9, further comprising:

forming a border pixel electrode in the peripheral region;

forming the electrophoretic ink layer over the border pixel electrode in the peripheral region; and electrically coupling the border pixel electrode and the storage electrode in the peripheral region.

11. The method of claim 10, wherein the border pixel electrode is electrically coupled to the storage electrode in the peripheral region via the contact holes.

12. A method of operating an electrophoretic display having an active region and a peripheral region, the peripheral region including at least one border electrode electrically connected to a border driving element and an electrophoretic ink film, comprising:

providing a signal to the border electrode; and maintaining an orientation of a plurality of microcapsules in the electrophoretic ink film in the peripheral region according to the signal provided on the border electrode.

13. The method of claim 12, wherein the electrophoretic ink film extends from the active region to the peripheral region.

14. The method of claim 12, wherein the active region includes a plurality of pixel elements, each pixel including a pixel driving element and at least a portion of an electrophoretic ink film further comprising:

providing data signals and a gate signals to the active regions to drive the pixel elements.

15. The method of claim 12, wherein the electrophoretic display further includes a common electrode extending from the active region to the peripheral region, further comprising:

providing common voltage signal to the active region and the peripheral region via the common electrode.

* * * * *